(12) United States Patent
Okamoto et al.

(10) Patent No.: US 9,707,871 B2
(45) Date of Patent: Jul. 18, 2017

(54) HEADREST

(71) Applicants: TOYOTA BOSHOKU KABUSHIKI KAISHA, Aichi-ken (JP); INOAC CORPORATION, Aichi (JP)

(72) Inventors: Kenji Okamoto, Aichi-ken (JP); Naoki Mitsuoka, Aichi-ken (JP); Satoru Tsuchiya, Yamanashi-ken (JP)

(73) Assignees: TOYOTA BOSHOKU KABUSHIKI KAISHA, Aichi-Ken (JP); INOAC CORPORATION, Aichi (JP)

(*) Notice: Subject to any disclaimer, the term of this patent is extended or adjusted under 35 U.S.C. 154(b) by 42 days.

(21) Appl. No.: 14/964,044

(22) Filed: Dec. 9, 2015

(65) Prior Publication Data
US 2016/0167551 A1    Jun. 16, 2016

(30) Foreign Application Priority Data

Dec. 10, 2014 (JP) .................................. 2014-249521

(51) Int. Cl.
*A47C 1/10* (2006.01)
*A47C 7/36* (2006.01)
(Continued)

(52) U.S. Cl.
CPC ................ *B60N 2/48* (2013.01); *B60N 2/58* (2013.01); *B60N 2/7017* (2013.01); *A47C 7/18* (2013.01);
(Continued)

(58) Field of Classification Search
CPC ...... B60N 2/4802; B60N 2/4826; B60N 2/48; B60N 2002/4888; B60N 2/4808;
(Continued)

(56) References Cited

U.S. PATENT DOCUMENTS 4,744,601 A * 5/1988 Nakanishi ................ B60N 2/48
297/216.12
5,061,419 A  10/1991 Kouda et al.
(Continued)

FOREIGN PATENT DOCUMENTS

DE  10 2004 018 4   11/2005
DE  10 2008 029 6   12/2009
JP  2006-69286      3/2006

OTHER PUBLICATIONS

Official Action, along with English-language translation thereof, in DE Appl. No. 10 2015 224 697.3 issued Apr. 13, 2017.

*Primary Examiner* — Chi Q Nguyen
(74) *Attorney, Agent, or Firm* — Greenblum & Bernstein, P.L.C.

(57) ABSTRACT

A headrest has a pad that is formed integrally with an outer cover by foam molding, and is also provided with: a low-resilience layer that is set in a front part of the pad and has lower resilience than the pad; a support member that is harder than the pad and supports the low-resilience layer from a backside of the low-resilience layer; and a blocking member that is located at a position to cover a contact area of the low-resilience layer and the support member from an outer circumference side while being in contact with at least one of the low-resilience layer and the support member and blocks infiltration of a foamed resin material of the pad into the contact area.

12 Claims, 9 Drawing Sheets

(51) Int. Cl.
*A61G 15/00* (2006.01)
*B60R 22/28* (2006.01)
*B60N 2/48* (2006.01)
*B60N 2/58* (2006.01)
*B60N 2/70* (2006.01)
*A47C 7/20* (2006.01)
*A47C 7/18* (2006.01)
*B29L 31/30* (2006.01)
*B29C 44/12* (2006.01)
*B29C 44/34* (2006.01)
*B29K 675/00* (2006.01)

(52) U.S. Cl.
CPC .............. *A47C 7/185* (2013.01); *A47C 7/20* (2013.01); *B29C 44/1228* (2013.01); *B29C 44/1285* (2013.01); *B29C 44/351* (2013.01); *B29K 2675/00* (2013.01); *B29L 2031/3023* (2013.01); *B60N 2/4802* (2013.01); *B60N 2/4808* (2013.01); *B60N 2/4826* (2013.01); *B60N 2/4885* (2013.01); *B60N 2002/4888* (2013.01)

(58) Field of Classification Search
CPC . B60N 2/4885; B29L 2031/3023; A47C 7/20; A47C 7/185; A47C 7/18
USPC .......... 297/404, 396, 395, 394, 391, 452.56, 297/DIG. 1, 216.12, 452.57, 452.37
See application file for complete search history.

(56) References Cited

U.S. PATENT DOCUMENTS

| | | | |
|---|---|---|---|
| 8,833,859 B2* | 9/2014 | Matsushima | B60N 2/4817 297/391 |
| 9,090,184 B2* | 7/2015 | Shamoto | B60N 2/48 |
| 2004/0195894 A1* | 10/2004 | Pal | B60N 2/4279 297/406 |
| 2005/0230862 A1 | 10/2005 | Kreuzer | |
| 2008/0265645 A1* | 10/2008 | Kasuya | B60N 2/4885 297/391 |
| 2009/0315372 A1 | 12/2009 | Tracht | |
| 2013/0285431 A1* | 10/2013 | Turletti | B60N 2/4873 297/391 |
| 2013/0313880 A1* | 11/2013 | Shamoto | B60N 2/48 297/391 |
| 2014/0062161 A1* | 3/2014 | Elenbaas | B29C 44/146 297/452.48 |
| 2015/0246628 A1* | 9/2015 | Ishimoto | B60N 2/48 297/410 |
| 2015/0306997 A1* | 10/2015 | Nasu | B60N 2/48 297/216.12 |
| 2015/0375648 A1* | 12/2015 | Navarro | B29C 44/14 297/391 |
| 2016/0121770 A1* | 5/2016 | Takahashi | B60N 2/68 297/452.18 |
| 2016/0347224 A1* | 12/2016 | Line | B60N 2/686 |

* cited by examiner

HEADREST

CROSS-REFERENCE TO RELATED APPLICATION

This application claims priorities from Japanese Patent Application No. 2014-249521 filed on Dec. 10, 2014, the entire subject matters of which is incorporated herein by reference.

TECHNICAL FIELD

The present disclosure relates to a headrest and more particularly to a headrest in which a pad is formed integrally with an outer cover by foam molding.

BACKGROUND

A vehicle seat is known in which a low-resilience layer is formed on a front part of a headrest (for example, see JP-A-2006-069286). Specifically, the headrest has a configuration in which the inside surrounded with a cover is filled with a pad formed of foamed urethane and a low-resilience layer which is less resilient than the pad is formed on the front part of the pad in a stacked manner.

However, in the related art, when the pad of the headrest is formed integrally with the cover by foam molding, there is a possibility that a foamed resin material of the pad will be infiltrated between the low-resilience layer and a support member supporting the low-resilience layer from the depth side to increase resilience and thus an effect of the low-resilience layer will decrease.

SUMMARY

The present disclosure is made in consideration of the above-mentioned circumstances, and one of objects of the present disclosure is to appropriately block infiltration of a foamed resin material between a low-resilience layer set in a front part of a pad and a support member supporting the low-resilience layer from a depth side in a cover-integrated foamed type headrest.

According to an illustrative embodiment of the present disclosure, there is provided a headrest in which a pad is formed integrally with an outer cover by foam molding. The headrest includes: a low-resilience layer that is set in a front part of the pad and has lower resilience than the pad; a support member that is harder than the pad and supports the low-resilience layer from a backside of the low-resilience layer; and a blocking member that is located at a position to cover a contact area of the low-resilience layer and the support member from an outer circumference side while being in contact with at least one of the low-resilience layer and the support member and blocks infiltration of a foamed resin material of the pad into the contact area.

According to another illustrative embodiment of the present disclosure, there is provided a headrest including: an outer cover; a pad that is made of a foamed resin material and disposed inside the outer cover; a support member that is disposed inside the pad; a low-resilience layer that is disposed in front of the support member and between the outer cover and the support member, the low-resilience layer being supported by the support member from back side and having lower resilience than the pad; and a blocking member that is disposed to cover a boundary between the low-resilience layer and the support member, the blocking member being made of a material that blocks infiltration of the foamed resin material of the pad into the boundary.

DETAILED DESCRIPTION

Hereinafter, an illustrative embodiment of the present disclosure will be described with reference to the accompanying drawings.

First, a configuration of a headrest 4 according to an embodiment will be described below with reference to FIGS. 1 to 9. In the following description, when "seat" is added to various directions such as "seat front side", "seat rear side", "seat upper side", "seat lower side", and "seat width direction," the directions represent various directions with respect to a seat 1.

Figure 1:
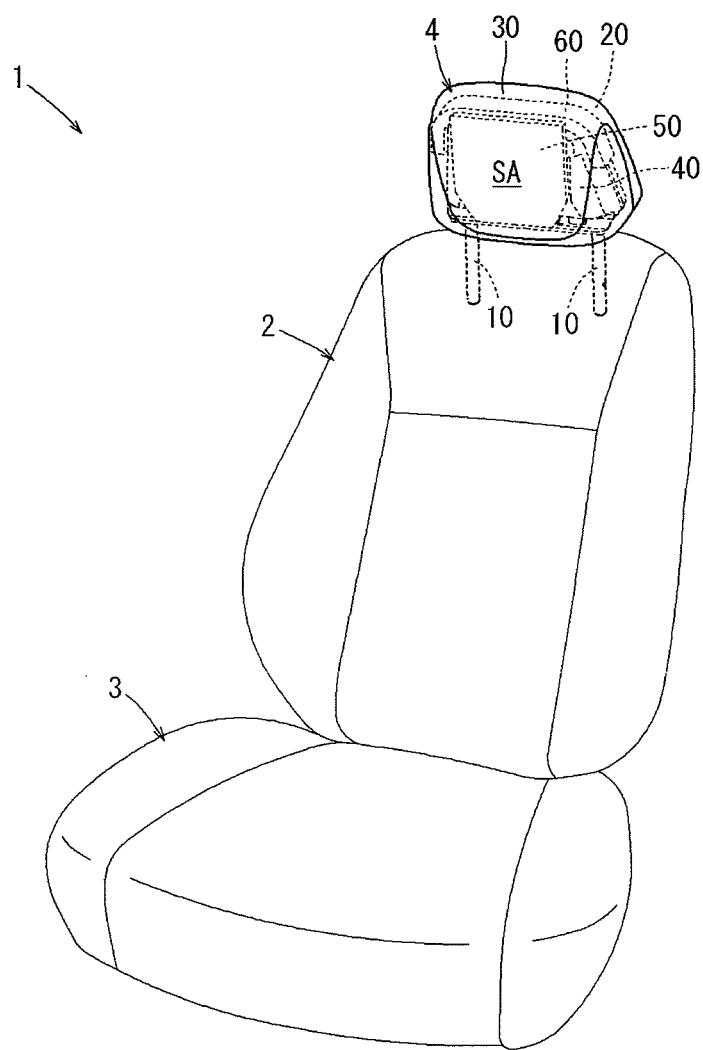
FIG. 1 is a perspective view schematically illustrating a configuration of a headrest according to a embodiment.

The headrest 4 according to the embodiment is configured as a head rest or a head restraint of a vehicle seat 1 as illustrated in FIG. 1. Here, the seat 1 is provided with a seat back 2 which serves as a back rest of a seated occupant, a seat cushion 3 which serves as a seating part, and the headrest 4 which serves as a head rest. The headrest 4 is attached to the top of the seat back 2. Specifically, the headrest 4 is fixed and attached to the top of the seat back 2 by inserting and fitting two stays 10 extending in a rod shape from the bottom side thereof into a support member (not illustrated) embedded in the top of the seat back 2 from the upper side thereof.

Figure 2:
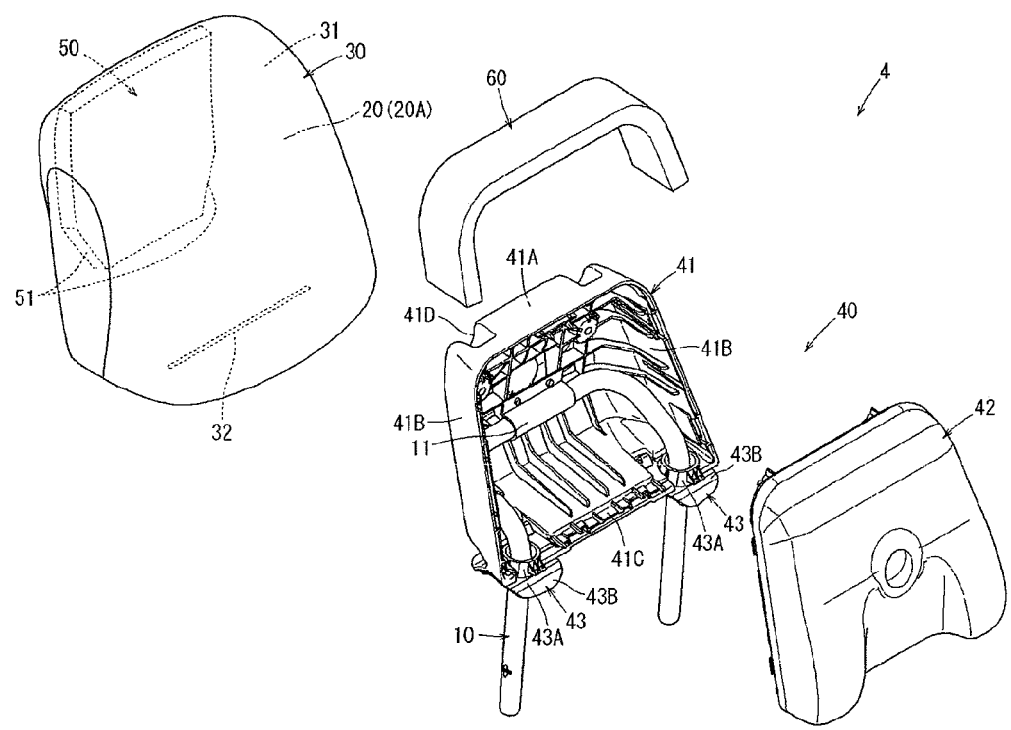
FIG. 2 is an exploded perspective view of the headrest.

As illustrated in FIG. 2, the headrest 4 is provided with a metal stay 10 that serves as a frame thereof, a foamed urethane pad 20 that is attached to the top of the stay 10 and relaxes and receives an external load, a synthetic resin cover 30 (outer cover) that covers the surface of the pad 20, a resin support case 40 that is attached to the top of the stay 10 and is embedded and installed in the pad 20, a low-resilience foamed urethane low-resilience layer 50 that is attached to an inner circumferential surface of a front part of the cover 30, and a low-breathability foamed urethane low-breathability layer 60 that is bonded to the top and both lateral sides of the support case 40. Here, the support case 40 corresponds to a "support member" in the present disclosure and the low-breathability layer 60 corresponds to a "blocking member" in the present disclosure.

The low-resilience layer 50 is configured by a member which is less resilient than the pad 20, and is configured to come in surface contact with a front plate portion 41D of a front piece 41 of the support case 40 and to relax and receive a load applied from the head of a seated occupant (see FIGS. 3 to 6). Specifically, the low-resilience layer 50 is disposed between the front part of the cover 30 and the front plate portion 41D of the support case 40 (in a support area SA to be described later) without the pad 20 interposed therebetween. By employing this configuration, the low-resilience layer 50 can receive a load applied from the head of a seated occupant so as to smoothly receive the head of the seated occupant using a low-resilience support structure which is strongly supported from the rear side by the support case 40 without causing a repulsive force (resilience) of the pad 20 to act.

Figure 6:
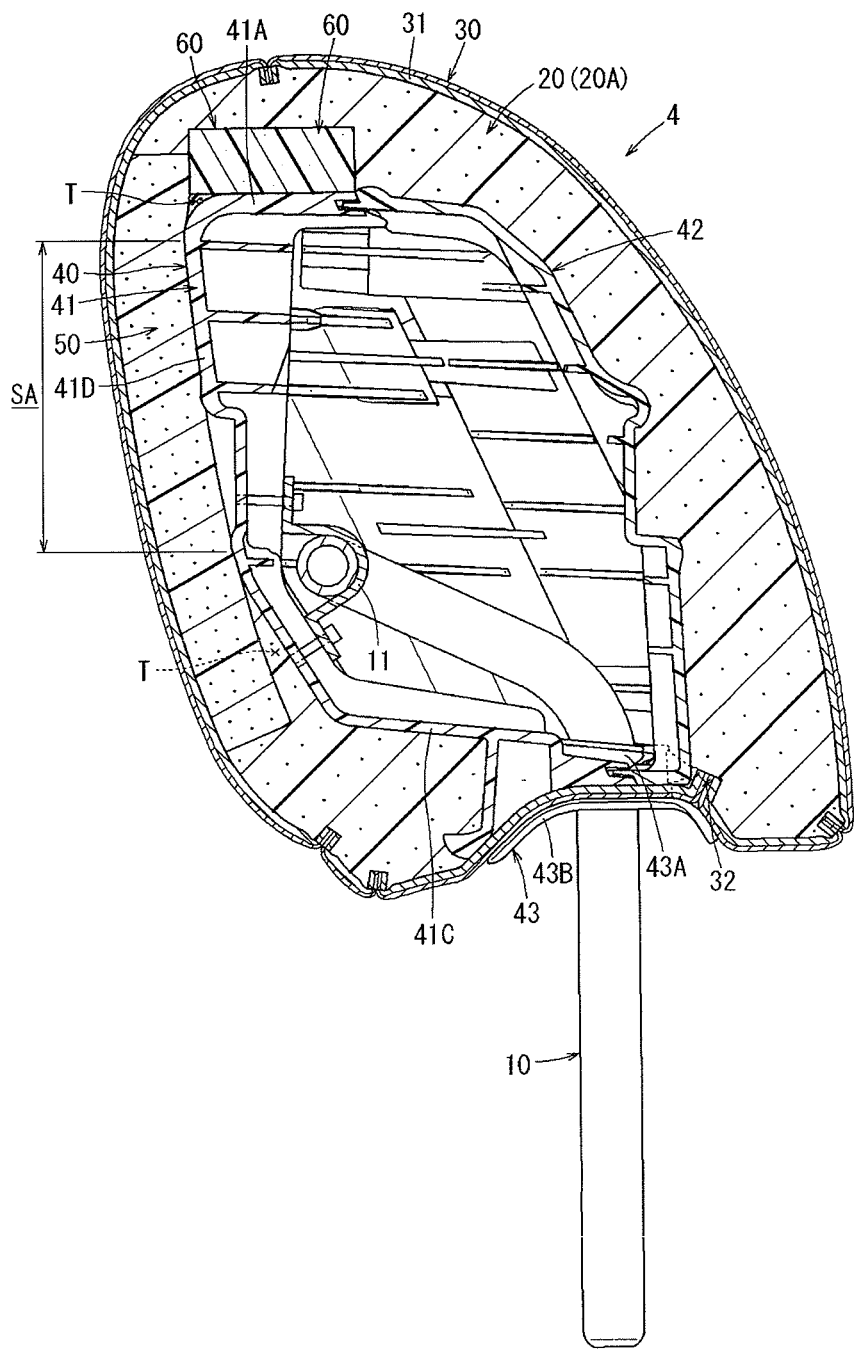
FIG. 6 is a cross-sectional view taken along line VI-VI shown in FIG. 4.

The configurations of the components of the headrest 4 will be described below in detail. The stay 10 has a configuration in which a metal rod-like member is bent in an inverted U shape and an upper part of the inverted U shape is bent obliquely upward to the front side. The pad 20 is formed integrally with the cover 30 by foam molding as illustrated in FIG. 6. Specifically, the pad 20 is formed integrally with the cover 30 by foam molding as follows.

Figure 7:
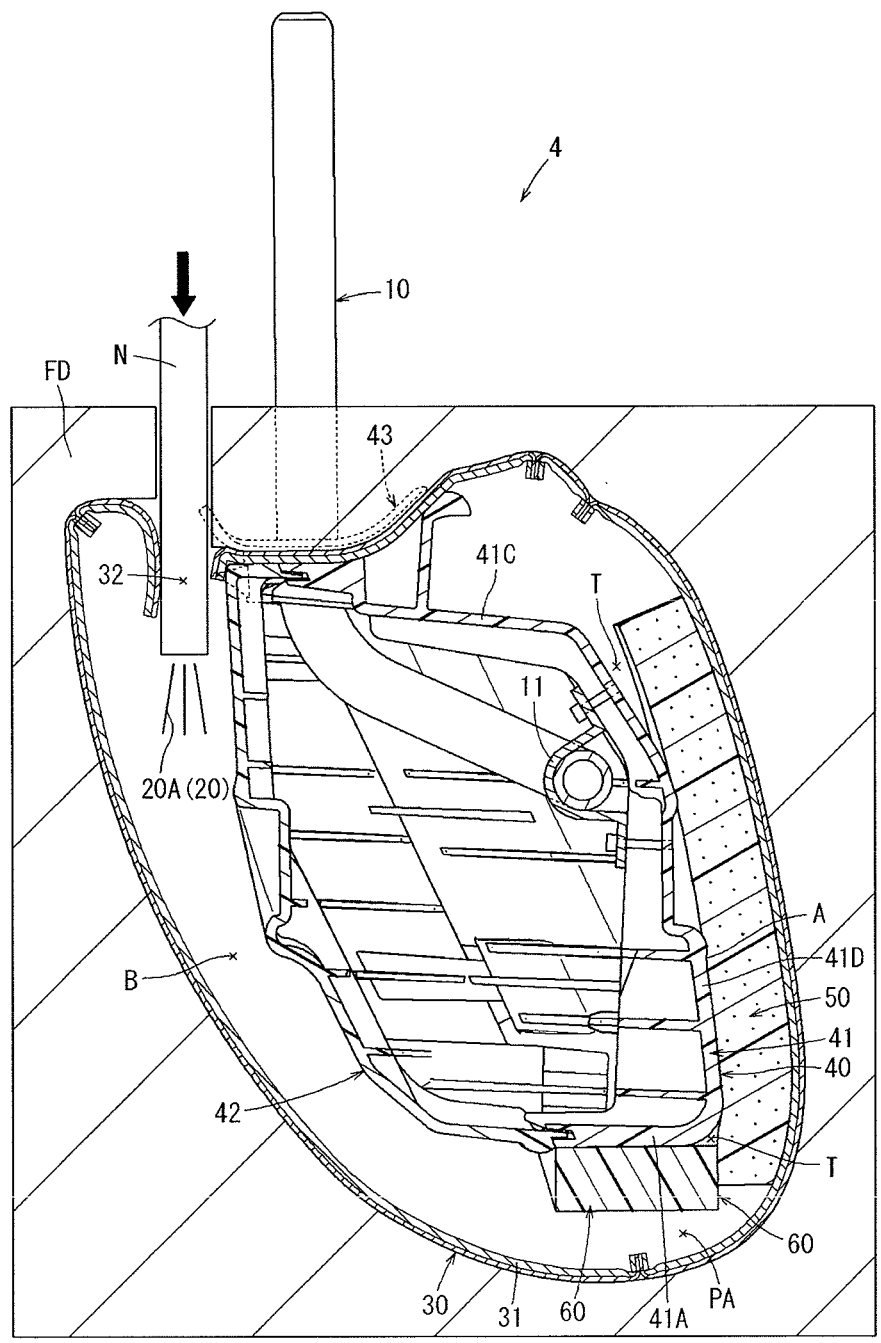
FIG. 7 is a diagram schematically illustrating a state in which the headrest is set in a molding die.
Figure 8:
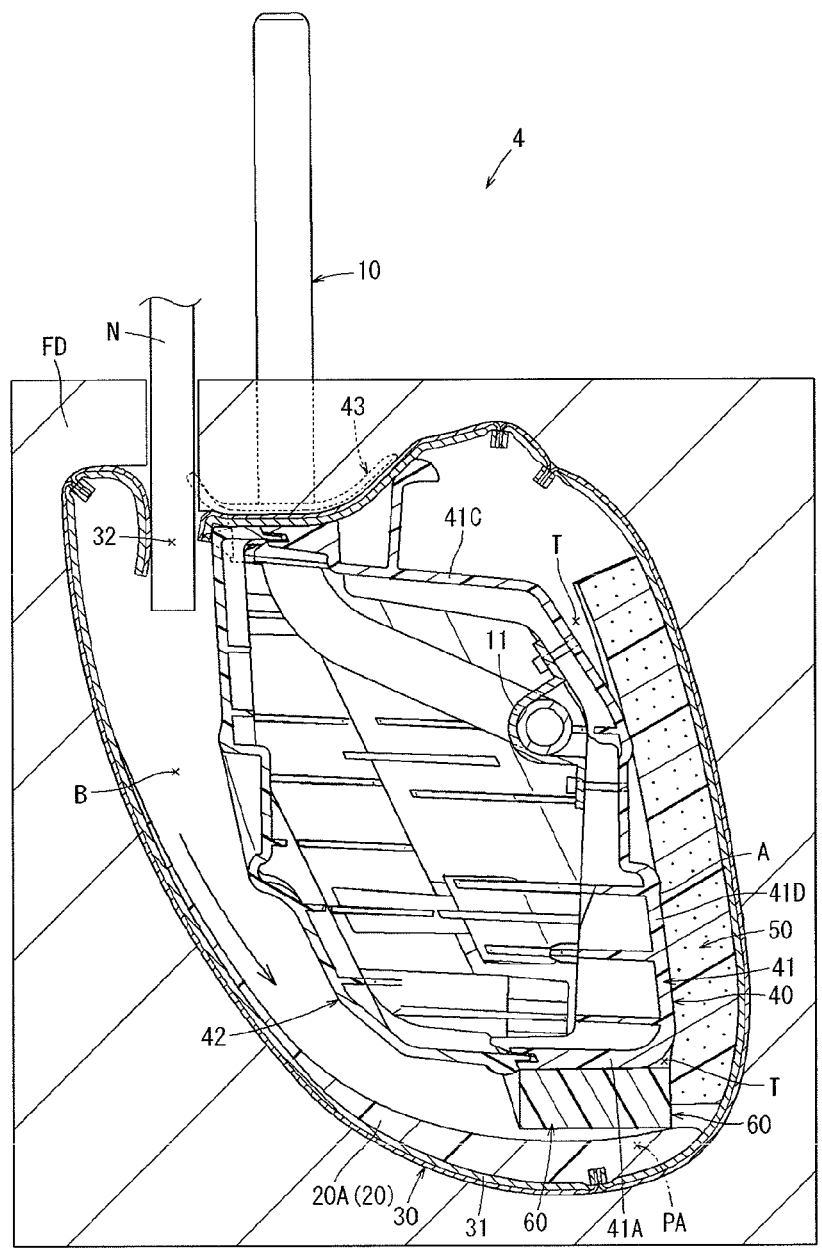
FIG. 8 is a diagram schematically illustrating a state in which a foamed resin material is injected into the headrest.
Figure 9:
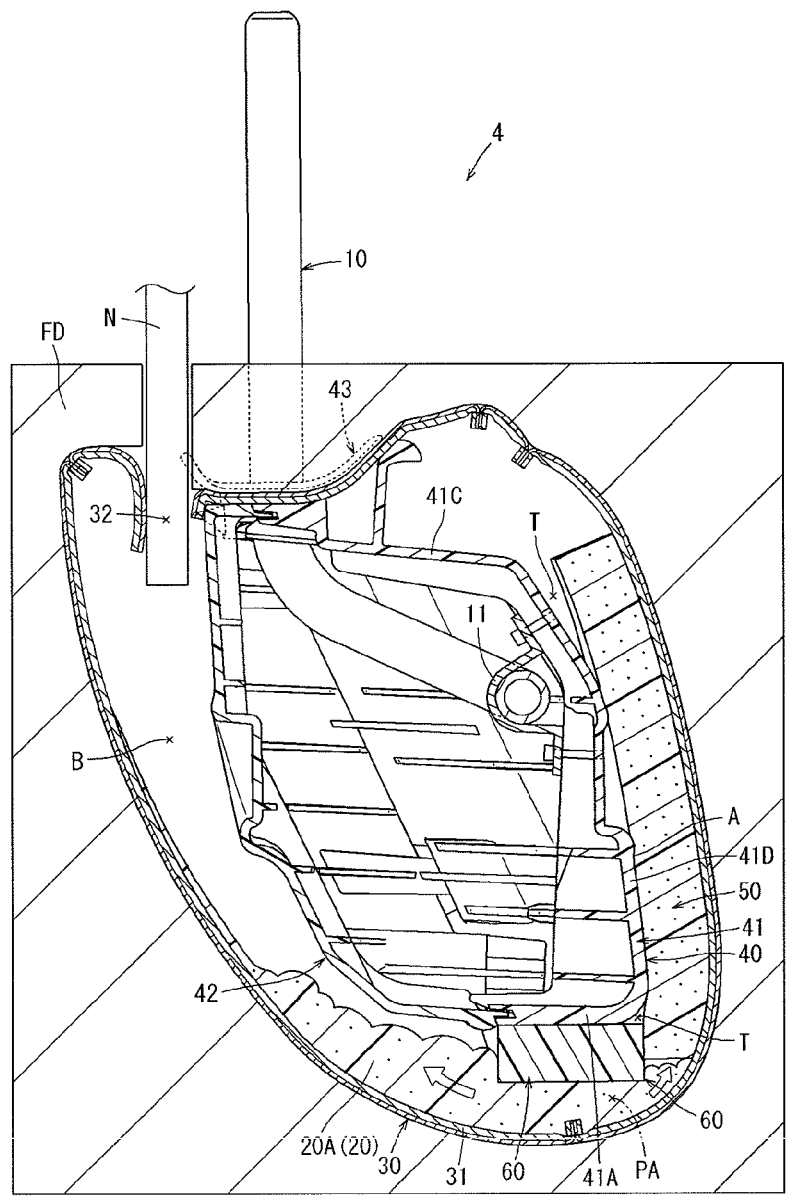
FIG. 9 is a diagram schematically illustrating a state in which a foamed resin material is being heated and foamed.

First, as illustrated in FIG. 7, the cover 30 is set in a foam molding die FD with the headrest 4 set upside down. Then, as illustrated in FIG. 8, a nozzle N is inserted into an injection port 32 which is opened and formed in the bottom (the top in the drawing) which is the top of the cover 30 after being turned upside down and a foamed resin material 20A is injected into the injection port. Then, as illustrated in FIG. 9, the foamed resin material 20A is heated and foamed in the foam molding die FD. Accordingly, as illustrated in FIG. 6, the foamed resin material 20A is heated and foamed to correspond to the shape of the foam molding die FD and is filled to be integrally bonded to the inner circumferential surface of the cover 30, and the pad 20 is formed in a state in which the pad is foamed and molded integrally with the cover 30.

As illustrated in FIG. 6, the cover 30 has a two-layer structure in which a thin laminated pad layer 31 formed of slab urethane is welded and stacked onto the entire inner circumferential surface of a synthetic resin skin thereof. The cover 30 has a configuration in which plural pieces are sutured in a bag shape. As illustrated in FIGS. 2 and 7, before the pad 20 is integrally foamed, the support case 40 attached to the top of the stay 10 is covered with the cover 30 from the seat upper side and the end of the cover is sealed in the lower part of the support case 40.

Figure 3:
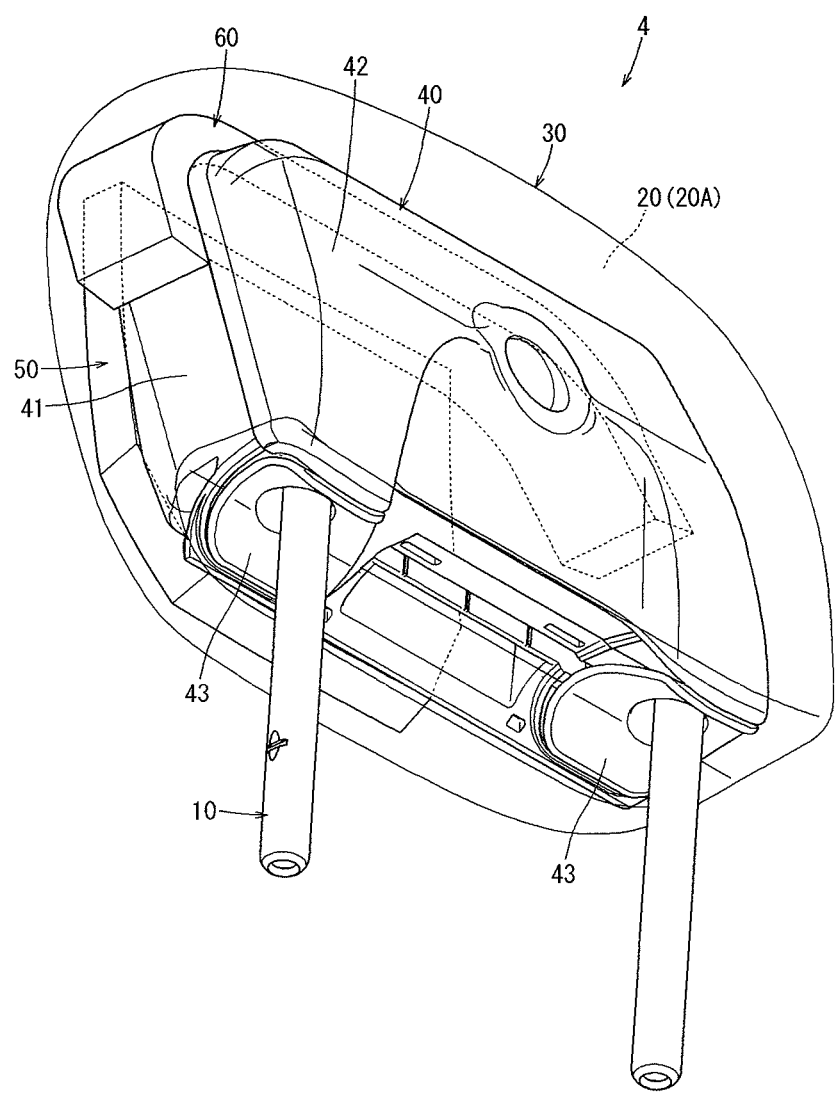
FIG. 3 is a perspective view illustrating an internal structure of the headrest.

As illustrated in FIGS. 3 and 6, two regions on the right and left sides of the cover 30 in an opening on the lower side of the cover with which the support case 40 is covered are sealed by bezels 43 attached to two regions on the right and left lower sides of the support case 40 so as to be pinched between the bottom surface of the support case 40 and the bezels. Accordingly, the cover 30 has a configuration in which the injection port 32 into which the nozzle N for injecting the foamed resin material 20A of the pad 20 described above with reference to FIGS. 8 to 9 can be inserted is opened in a region between the two regions on the right and left sides sealed by the bezels 43.

The injection port 32 is neatly closed by heating and foaming the foamed resin material 20A in the cover 30 and filling the cover so as to overlap and combine the pieces of the cover 30 adjacent to the injection port 32. Since the laminated pad layer 31 is integrally stacked on the entire inner circumferential surface of the cover 30, the cover is bonded well to the foamed resin material 20A of the pad 20 heated and foamed therein.

As illustrated in FIG. 2, the support case 40 is divided into two pieces of a front piece 41 and a rear piece 42. The front piece 41 and the rear piece 42 are formed in container-like shapes which are opened to face each other. The front piece 41 and the rear piece 42 are fitted to each other in the front-rear direction so as to close the openings thereof, and the front piece and the rear piece are attached integrally to each other to form a closed box shape by fitting structures of claws formed therebetween.

Specifically, the front piece 41 and the rear piece 42 are attached so as to interpose an upper part of the stay 10 bent obliquely upward to the front side therebetween from the front and rear sides. In the stay 10, the upper arm part 10 connecting both legs of the inverted U shape is integrally coupled to the rear surface of the front plate portion 41D of the front piece 41 by a coupling fitting 11. Accordingly, by inserting and attaching the rear piece 42 into the front piece 41 attached to the stay 10, the support case 40 is integrally attached to the upper part of the stay 10 so as to cover the upper part in a box shape (see FIG. 3).

As illustrated in FIG. 2, the resin bezels 43 are inserted and integrally attached into two regions on the right and left sides of a bottom plate portion 41C of the front piece 41 from the seat lower side. By attaching the bezels 43 to the bottom plate portion 41C of the front piece 41 and the bottom plate portion of the rear piece 42 from the seat lower side, the fitting structures of claws formed in the bezels 43 between the bottom plate portion 41C of the front piece 41 and the bottom plate portion of the rear piece 42 are fitted to integrally attach the bezels to the bottom plate portion 41C of the front piece 41 and the bottom plate portion of the rear piece 42. Each bezel 43 has a cap shape having a hat-like cross-section. Specifically, each bezel 43 includes a cylindrical portion 43A passing both legs of the stay 10 and a flange portion 43B protruding in a flange shape outward in the radial direction from a bottom end of the cylindrical portion 43A.

After the rear piece 42 is fitted to the front piece 41 of the support case 40 and the resultant structure is covered with the cover 30, the flange portions 43B are brought into contact with the bottom plate portion 41C of the front piece 41 and the bottom plate portion of the rear piece 42 and are attached thereto (see FIG. 6) by passing the legs of the stay 10 through the cylindrical portions 43A and fitting and attaching the flange portions 43B to the bottom plate portion 41C of the front piece 41 and the bottom plate portion of the rear piece 42 using the fitting structures of claws. Accordingly, by interposing two parts on the right and left sides of the opening in the cover 30 between the parts coming in contact with the flange portions 43B, the two parts are sealed between the flange portions 43B and the bottom surface of the support case 40.

The low-resilience layer 50 is formed of a foamed urethane material having a substantially flat panel shape and is less resilient than the pad 20. The low-resilience layer 50 is sutured in a state in which the low-resilience layer is overlapped and combined with the inner circumferential surface of the front part of the cover 30. The low-resilience layer 50 comes in surface contact with the front plate portion 41D of the support case 40 in a state in which the bag of the cover 30 is filled with the pad 20 by integral foaming, that is, in a state of the headrest 4 as a finished product.

Figure 4:
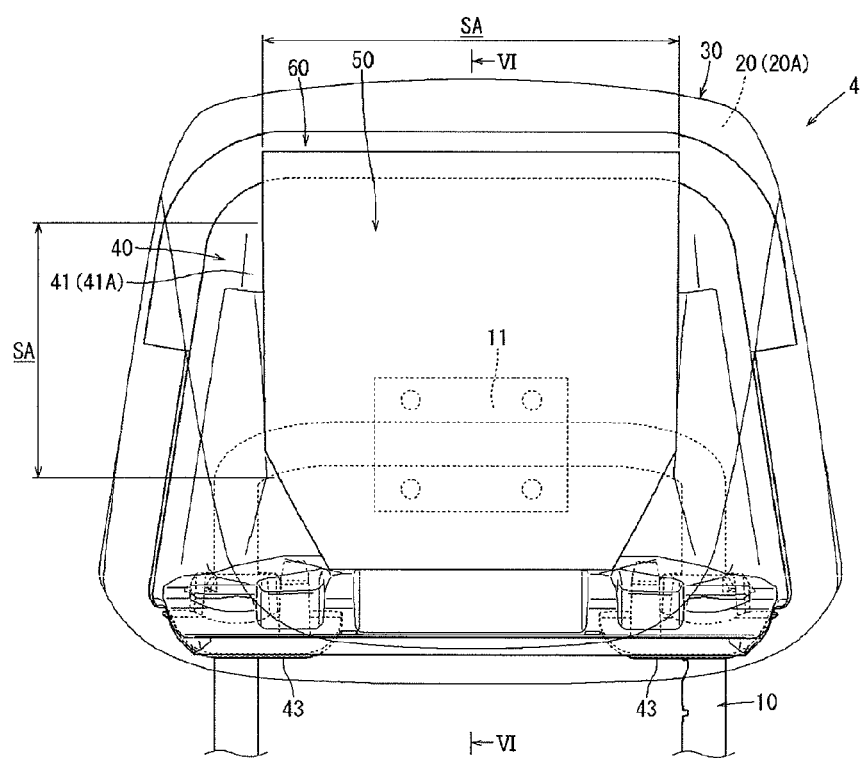
FIG. 4 is a front view illustrating the internal structure of the headrest.
Figure 5:
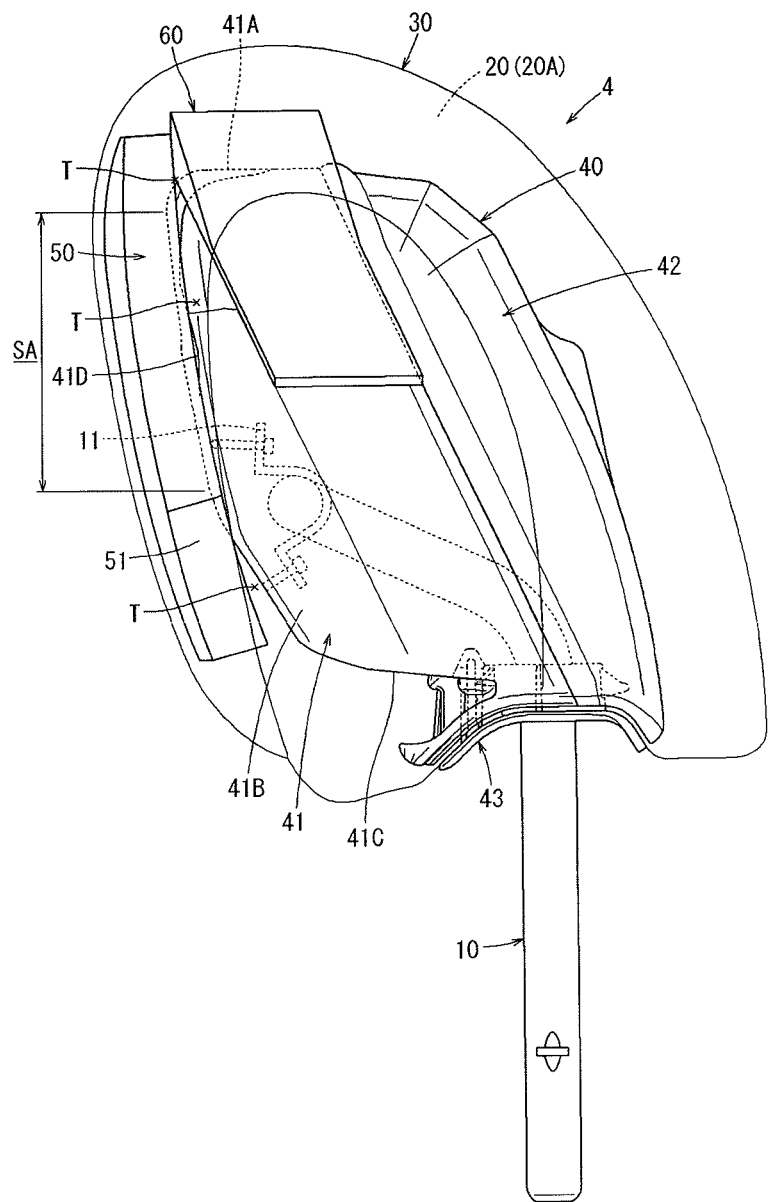
FIG. 5 is a side view illustrating the internal structure of the headrest.

Specifically, as illustrated in FIGS. 4 and 5, the front plate portion 41D of the support case 40 supporting the low-resilience layer 50 from the rear side has a substantially flat shape substantially straightly facing a plane on the seat front side in a support area SA as an area which receives the head of a seated occupant, while having a shape rounded or obliquely inclined or retreating to the seat rear side in an outer circumferential area departing from the support area SA.

The low-resilience layer 50 is formed to be slightly larger than the support area SA of the front plate portion 41D of the support case 40. The low-resilience layer 50 comes in surface contact with the front plate portion 41D in a region in front of the support area SA of the front plate portion 41D, but is disposed with a space T in the front-rear direction from the front plate portion 41D in a region disposed in front of the outer circumferential area rounded or inclined to the seat rear side of the front plate portion 41D. However, the space T is filled with the foamed resin material 20A by integrally foaming the pad 20 in the bag of the cover 30 (see FIG. 6). As illustrated in FIGS. 2 and 4, chamfered portions 51 which are obliquely chamfered are formed at both corners on the right and left sides of the lower end of the low-resilience layer 50 departing downward from the support area SA.

The low-breathability layer 60 is formed of a substantially flat foamed urethane material which has lower breathability than the pad 20. The low-breathability layer 60 itself has a substantially flat shape which is horizontally long. However, the low-breathability layer 60 is disposed in a substantially inverted U shape by bonding the low-breathability layer to a top plate portion 41A and both side plate portions 41B of the front piece 41 of the support case 40 in a surface contact state with a double-sided tape not illustrated.

As illustrated in FIGS. 3 and 4, the low-breathability layer 60 is attached such that an edge thereof on the seat rear side follows a rear edge of the top plate portion 41A extending straightly in the seat width direction and rear edges of both side plate portions 41B extending obliquely downward so as to correspond to the shape of the rear edges of the front piece 41 of the support case 40. As illustrated in FIG. 4, the low-breathability layer 60 has a thickness in the front-rear direction in which the edge on the seat front side thereof protrudes to the seat front side up to a position substantially parallel to the front edge of the top plate portion 41A of the front piece 41 of the support case 40.

According to this configuration, as illustrated in FIG. 6, the edge on the seat front side of the low-breathability layer 60 comes in surface contact with a rear surface of a part extending upward from the support area SA of the low-resilience layer 50 in a region located above the top plate portion 41A. That is, since the low-breathability layer 60 is finished such that the upper part of the cover 30 is curved backward in integrally foaming the pad 20, the upper area of the low-resilience layer 50 formed in the upper part is pressed against the low-breathability layer from the front side by the curve and is in surface contact with the low-breathability layer.

As illustrated in FIG. 5, the low-breathability layer 60 is disposed such that the edge on the seat front side thereof does not come in contact with the low-resilience layer 50 and has a gap in the seat front-rear direction and the seat width direction from the low-resilience layer 50 in the regions covering both side plate portions 41B. As illustrated in FIG. 4, the low-resilience layer 50 has a shape in which the width in the seat width direction is smaller than the width in the seat width direction of the front plate portion 41D of the front piece 41 of the support case 40.

The low-breathability layer 60 is bonded to come in surface contact with the top plate portion 41A and both side plate portions 41B of the front piece 41 of the support case 40. Accordingly, as illustrated in FIGS. 7 to 9, when the pad 20 is foamed and molded integrally with the cover 30, infiltration of the foamed resin material 20A of the pad 20 between the low-resilience layer 50 and the front plate portion 41D of the support case 40 is appropriately blocked. Specifically, the foamed resin material 20A of the pad 20 is foamed and molded integrally with the cover 30 as follows.

That is, as illustrated in FIGS. 7 and 8, the foamed resin material 20A of the pad 20 is injected into the cover 30 in a state in which the nozzle N is inserted into the injection port 32 of the cover 30, runs down along the inclined surface on the rear side of the cover 30, and is retained in a retaining portion PA on the downstream side. Since the finished product of the headrest 4 has a mountain shape in which a position immediately above (position immediately below in the drawing) an area close to the rear side of the top plate portion 41A of the front piece 41 of the support case 40 is a peak, the retaining portion PA is disposed as a concave portion of the cover 30 formed at a position immediately above (position immediately below in the drawing) the area close to the rear side of the top plate portion 41A. The headrest 4 has a curve shape which is relatively steeply curved on the front side and the rear side in the part of the mounting peak on the lower side serving as the retaining portion PA.

The foamed resin material 20A of the pad 20 is retained in the retaining portion PA of the mounting peak. Accordingly, when the foamed resin material 20A is heated and foamed from this position, a relatively-high foaming pressure is applied to the top plate portion 41A of the front piece 41 of the support case 40 located immediately above and an area in the vicinity thereof in the drawing (see FIG. 9). When the high foaming pressure of the foamed resin material 20A acts to get between the front plate portion 41D of the support case 40 and the low-resilience layer 50, there is a problem in that the foamed resin material 20A is infiltrated therebetween.

However, since the low-breathability layer 60 is formed immediately above the retaining portion PA, the getting of the high foaming pressure of the foamed resin material 20A between the front plate portion 41D of the support case 40 and the low-resilience layer 50 is blocked. As illustrated in FIG. 4, the low-breathability layer 60 is formed to cover the entire range in the seat width direction of a contact area A of the support area SA of the front plate portion 41D of the support case 40 and the low-resilience layer 50 from the upper side (the lower side in FIG. 9). Accordingly, as illustrated in FIG. 9, the low-breathability layer 60 serves to appropriately block the acting of the high foaming pressure of the foamed resin material 20A on the contact area A. Specifically, since the low-breathability layer 60 is pressed backward against the area of the low-resilience layer 50 on the lower side in FIG. 9, the low-breathability layer appropriately blocks the acting of the high foaming pressure of the foamed resin material 20A on the contact area A.

Accordingly, the foamed resin material 20A which is heated and foamed from the retaining portion A is expanded and foamed along a space B between the inner circumferential surface of the cover 30 and both side surfaces or the rear surface of the support case 40 without applying the high foaming pressure to the contact area A of the front plate portion 41D of the support case 40 and the low-resilience layer 50, and fills the space B between the cover 30 and the support case 40 along the shape of the foam molding die FD. At this time, the foamed resin material 20A is expanded to go into the upper side or the lateral sides while the foaming pressure is slowly lowered with the expansion foaming. The foamed resin material 20A is thoroughly spread into the space T formed between the outer circumferential area of the low-resilience layer 50 and the front plate portion 41D of the support case 40 with the appropriately decreased foaming pressure, and fully fills the cover 30.

Since the low-breathability layer 60 is formed to a certain extent (a half or less) in the height direction in both side plate portions 41B of the front piece 41 of the support case 40, infiltration of the foamed resin material 20A expanded and foamed from the retaining portion PA into the contact area A of the front plate portion 41D of the support case 40 and the low-resilience layer 50 from a lateral side with a high foaming pressure can be appropriately blocked.

As described in the above in detail, the headrest 4 according to the embodiment is configured as follows. That is, the headrest is a headrest 4 in which a pad 20 is formed integrally with a cover 30 by foam molding, and includes a low-resilience layer 50 that has lower resilience than the pad 20, a support case 40 (support member) that is harder than the pad 20, and a low-breathability layer 60 (blocking member). The low-resilient layer 50 is set in a front part of the pad 20. The support case 40 supports the low-resilience layer 50 from a depth side. The low-breathability layer 60 is formed to cover a contact area A of the low-resilience layer 50 and the support case 40 from an outer circumference side while coming in contact with both the low-resilience layer and the support member, and blocks infiltration of a foamed resin material 20A of the pad 20 into the contact area A.

By forming the low-breathability layer 60 as described above, it is possible to appropriately prevent infiltration of the foamed resin material 20A between the low-resilience layer 50 set in the front part of the pad 20 and the support case 40 supporting the low-resilience layer from the depth side. Accordingly, in the cover-integrated foaming type headrest 4, it is possible to appropriately bring the low-resilience layer 50 into contact with the support case 40 from the rear side without lowering the low-resilience effect of the low-resilience layer 50.

The low-breathability layer 60 is formed to cover the contact area A from the upper side and both lateral sides. By employing this configuration, when the foamed resin material 20A of the pad 20 is injected into the cover 30 which is set upside down and is foamed and molded integrally with the cover 30 and the foamed resin material 20A of the pad 20 injected into the cover 30 is expanded from the area (retaining portion PA) in which the foamed resin material runs down over the inclination of the cover 30 and is retained, infiltration of the foamed resin material 20A into the contact area A can be appropriately prevented by the low-breathability layer 60.

The foamed resin material 20A of the pad 20 is injected into the cover 30 set upside down and is foamed and molded integrally with the cover 30. The low-resilience layer 50 is attached integrally to the inner circumferential surface of the front part of the cover 30. The low-breathability layer 60 is bonded to the support case 40 to be in surface contact therewith in the height direction immediately above the area (retaining portion PA) in which the foamed resin material 20A of the pad 20 injected into the cover 30 runs down over the inclination of the cover 30 and is retained, and is also set to come in contact with the low-resilience layer 50 attached to the inner circumferential surface of the cover 30 from the rear side.

By employing this configuration, even when the foaming pressure of the foamed resin material 20A is applied to the low-breathability layer 60, the low-breathability layer is strongly supported by the support case 40 and can exhibit a stable infiltration blocking function. Accordingly, it is possible to more appropriately block infiltration of the foamed resin material 20A into the contact area A using the low-breathability layer 60.

The low-breathability layer 60 is formed of a low-breathability soft foamed material which does not transmit the foamed resin material 20A of the pad 20. In this way, by forming the low-breathability layer 60 out of the low-breathability soft foamed material, a seated occupant does not easily feel uncomfortable in use due to formation of the low-breathability layer 60. Specifically, by forming the low-breathability layer 60 out of the low-breathability foamed material, it is possible to integrally bond the low-resilience layer and the support case without infiltrating the foamed resin material 20A of the pad 20 therein and curing the foamed resin material.

While the present disclosure has been described with reference to an embodiment, the present disclosure can be embodied in various forms in addition to the above-mentioned embodiment. For example, the "headrest" according to the present disclosure may be applied to a seat used for a vehicle such as a train other than an automobile or a seat used for various vehicles such as an aircraft and a ship.

The low-resilience layer may be formed of a foamed resin material other than foamed urethane described in the above-mentioned embodiment as long as the low-resilient layer is less resilient than the pad. The blocking member may be formed of a foamed resin material other than foamed urethane described in the above-mentioned embodiment. The blocking member may be formed of a material such as rubber, metal, resin, or fabric other than the foamed resin.

As long as the blocking member is disposed to cover the contact area of the low-resilience layer and the support member from the outer circumference side while coming in contact with at least one thereof so as to prevent the foamed resin material of the pad from being infiltrated into the contact area, the blocking member may be disposed to cover the contact area over the whole circumference. The position at which the blocking member is disposed is not limited to the position described in the above-mentioned embodiment.

The blocking member may be disposed to come in contact with one of the low-resilience layer and the support member or may be disposed to come in contact with both thereof. In this case, the blocking member may be coupled integrally with a member with which the blocking member comes in contact, or may simply come in contact therewith but may not be coupled therewith. The coupling of the blocking member with the method with which the blocking member comes in contact may be carried out by forming a concave portion or a hole to which the blocking member is fitted in the member with which the blocking member comes in contact or forming a protrusion which is fitted to the concave portion or the hole formed in the blocking member. The blocking member may be formed in a shape extending to cover the contact area of the support member and/or the low-resilience layer from the outer circumference side.

The support member may be formed of a member which is harder than the pad and which supports the low-resilience layer from the rear side or may be a stay.

The pad may be interposed between the low-resilience layer and the cover. In this case, the low-resilience function of the low-resilience layer is damaged by the pad. However, for example, in adjusting the resilience against the head of a seated occupant to a desired magnitude, it can also be considered that the pad is interposed between the low-resilience layer and the cover. The low-resilience layer may be attached to the cover by adhesion such as welding or suturing in addition to pasting.

The foamed resin material of the pad may be injected into the cover, not in a state in which the headrest is set upside down, but from a lateral side or an upper side in a state in which the headrest is turned sideways or non-inverted.

In the above-mentioned embodiment, the cover covering the surface of the pad is formed of synthetic leather, but the cover may be formed of another material such as fabric or leather.

As described with reference to the embodiment, according to a first aspect of the present disclosure, there is provided a headrest in which a pad is formed integrally with an outer cover by foam molding and which includes a low-resilience layer that has lower resilience than the pad, a support member that is harder than the pad, and a blocking member. The low-resilience layer is set in a front part of the pad. The support member supports the low-resilience layer from a depth side. The blocking member is formed to cover a contact area of the low-resilience layer and the support member from an outer circumference side while coming in contact with at least one of the low-resilience layer and the support member and blocks infiltration of a foamed resin material of the pad into the contact area.

According to the first aspect, by disposing the blocking member, it is possible to appropriately block infiltration of the foamed resin material between the low-resilience layer set in the front part of the pad and the support member supporting the low-resilience layer from the depth side. Accordingly, in the cover-integrated foamed type headrest, the low-resilience layer can be appropriately supported by the support member from the depth side without weakening an effect of low resilience of the low-resilience layer.

A second aspect of the present disclosure provides the following configuration in the first aspect. The blocking member is disposed to cover the support member from a top side and both lateral sides.

According to the second aspect, when the foamed resin material of the pad is injected into the outer cover set upside down and is foamed and molded integrally with the outer cover and the foamed resin material of the pad injected into the outer cover expands in an area in which the foamed resin material runs down over a slope of the outer cover and is retained, it is possible to appropriately block infiltration of the foamed resin material into the contact area using the blocking member.

A third aspect of the present disclosure provides the following configuration in the first or second aspect. The foamed resin material of the pad is injected into the outer cover which is set upside down and is formed integrally with the outer cover by foam molding. The low-resilience layer is integrally attached to an inner circumferential surface of a front part of the outer cover. The blocking member is bonded to the support member to come in surface contact with the support member in a height direction in a part immediately above an area in which the foamed resin material of the pad injected into the outer cover runs down over a slope of the outer cover and is retained and, the blocking member is set to come in contact with the low-resilience layer attached to the inner circumferential surface of the outer cover from a rear side.

According to the third aspect, even when the blocking member is supplied with a foaming pressure of the foamed resin material, the blocking member can be strongly supported by the support member and can exhibit a stable infiltration blocking function. Accordingly, it is possible to more appropriately block infiltration of the foamed resin material into the contact area using the blocking member.

A fourth aspect of the present disclosure provides the following configuration in any one of the first to third aspects. The blocking member is formed of a low-breathability soft foamed material which does not transmit the foamed resin material of the pad.

According to the fourth aspect, since the blocking member is formed of a soft foamed material having low breathability, a user less feels uncomfortable in use due to installation of the blocking member. Specifically, since the blocking member is formed of a low-breathability foamed material, the headrest can be formed in a state in which the components are integrally bonded to each other without infiltrating and curing the foamed resin material of the pad.

What is claimed is:

1. A headrest in which a pad is formed integrally with an outer cover by foam molding, the headrest comprising:
    a low-resilience layer that is set in a front part of the pad and has lower resilience than the pad;
    a support member that is harder than the pad and supports the low-resilience layer from a backside of the low-resilience layer; and
    a blocking member that is located at a position to cover a contact area of the low-resilience layer and the support member from an outer circumference side while being in contact with at least one of the low-resilience layer and the support member and blocks infiltration of a foamed resin material of the pad into the contact area.

2. The headrest according to claim 1,
    wherein the blocking member is disposed to cover the support member from a top side and both lateral sides.

3. The headrest according to claim 1,
    wherein the foamed resin material of the pad is injected into the outer cover which is set upside down and is formed integrally with the outer cover by foam molding,
    wherein the low-resilience layer is integrally attached to an inner circumferential surface of a front part of the outer cover; and
    wherein the blocking member is bonded to the support member to be in surface contact with the support member in a height direction in a part immediately above an area in which the foamed resin material of the pad injected into the outer cover runs down over a slope of the outer cover and is retained, and the blocking member is set to be in contact with the low-resilience layer attached to the inner circumferential surface of the outer cover from a rear side.

4. The headrest according to claim 1,
    wherein the blocking member is made of a low-breathability soft foamed material that does not transmit the foamed resin material of the pad.

5. A headrest comprising:
    an outer cover;
    a pad that is made of a foamed resin material and disposed inside the outer cover;
    a support member that is disposed inside the pad;
    a low-resilience layer that is disposed in front of the support member and between the outer cover and the support member, the low-resilience layer being supported by the support member from back side and having lower resilience than the pad; and
    a blocking member that is disposed to cover a boundary between the low-resilience layer and the support member, the blocking member being made of a material that blocks infiltration of the foamed resin material of the pad into the boundary.

6. The headrest according to claim 5,
wherein the blocking member is disposed at a position to cover the boundary at an upper part of the support member.
7. The headrest according to claim 6,
wherein the blocking member is disposed at a position to cover the boundary at the upper part and at least a part of both side part of the support member.
8. The headrest according to claim 5,
wherein the blocking member is in contact with a backside of the low-resilience layer.
9. The headrest according to claim 5,
wherein the blocking member is made of a low-breathability soft foamed material.
10. The headrest according to claim 5,
wherein the blocking member is disposed on an upper face of the support member.
11. The headrest according to claim 10,
wherein the blocking member is adhered to an upper face of the support member.
12. The headrest according to claim 10,
wherein the foamed resin material of the pad is disposed between the blocking member and the outer cover at a position above the blocking member.

* * * * *